UNITED STATES PATENT OFFICE.

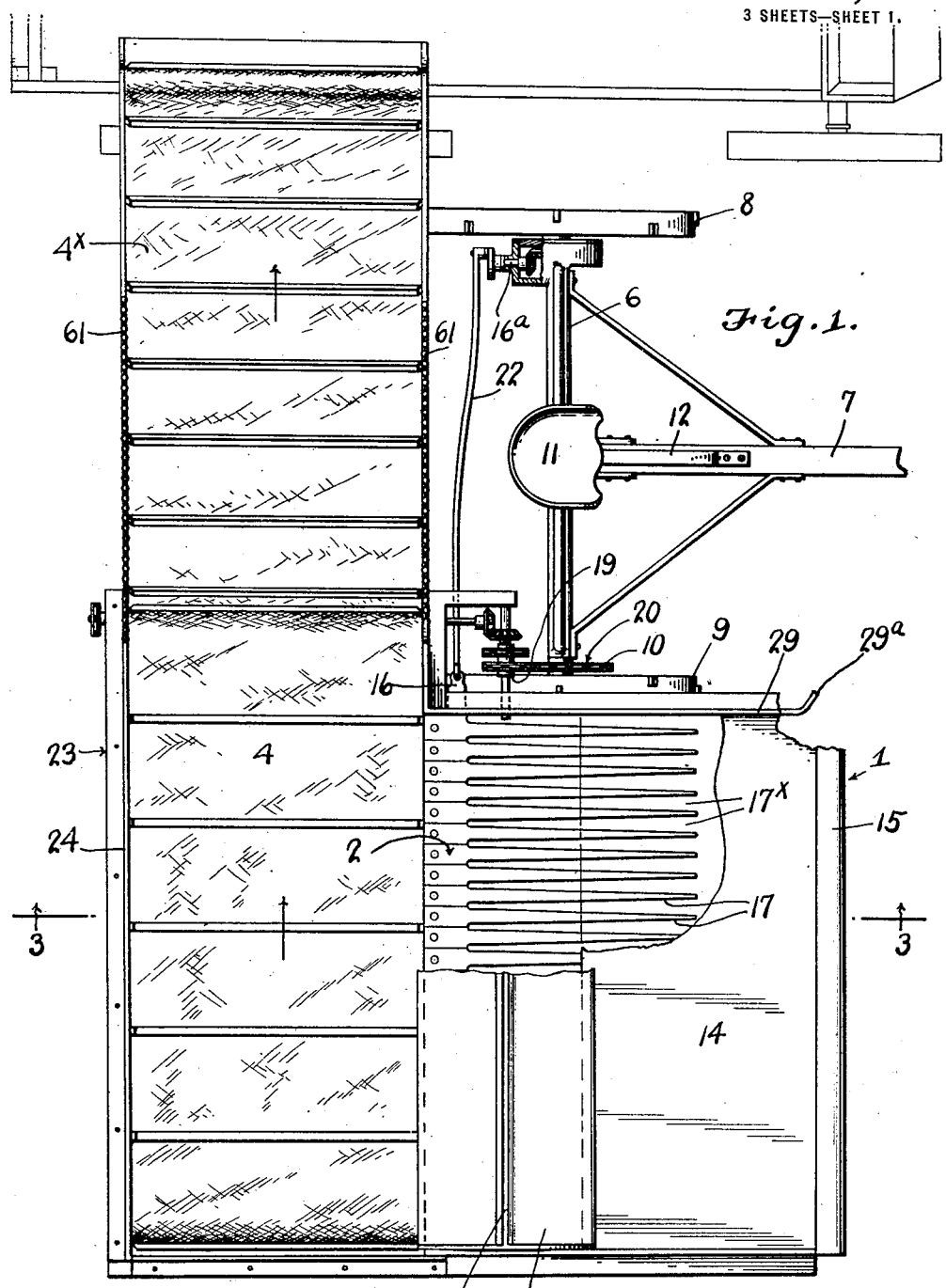

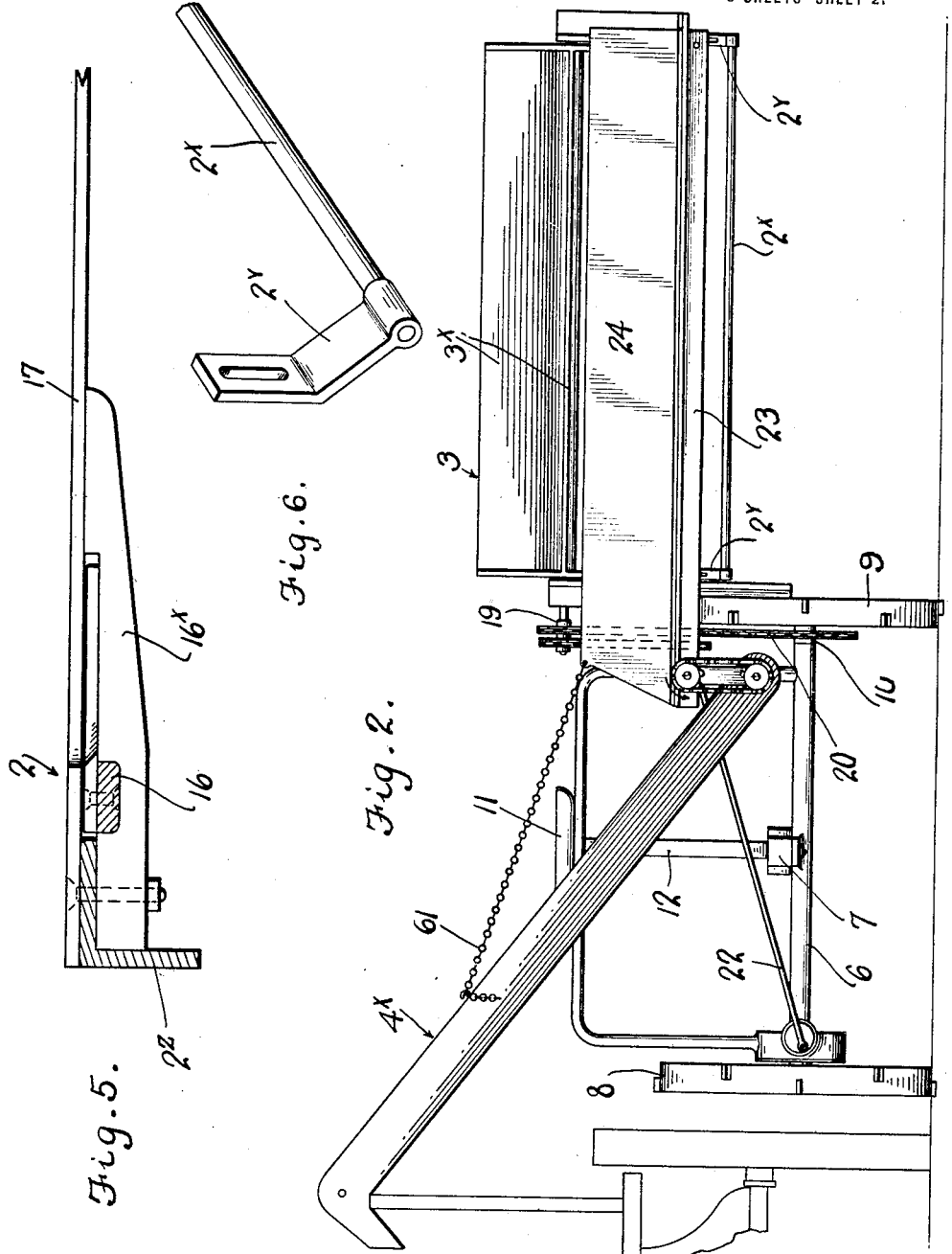

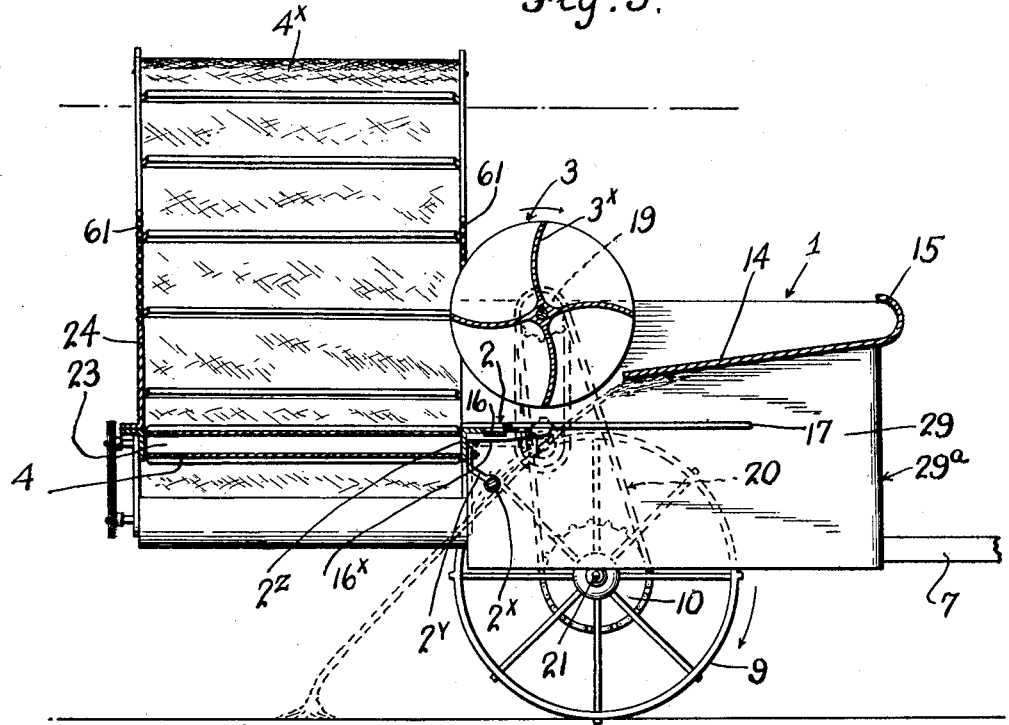

RAYMOND A. BOTTS, OF HANFORD, CALIFORNIA.

HARVESTER FOR EGYPTIAN CORN, MILO MAIZE, AND THE LIKE.

1,370,405. Specification of Letters Patent. Patented Mar. 1, 1921.

Application filed May 25, 1920. Serial No. 384,119.

*To all whom it may concern:*

Be it known that I, RAYMOND A. BOTTS, a citizen of the United States, residing at Hanford, in the county of Kings and State of California, have invented new and useful Improvements in Harvesters for Egyptian Corn, Milo Maize, and the like, of which the following is a specification.

Difficulty has been experienced in the harvesting of Egyptian corn, milo maize and the like, because of the uneven height of the heads and the fact that too much stalk is cut with those heads that are comparatively high.

Therefore in common with the invention of my contemporary application, the general object of my present invention is the provision of a harvester that is adapted to compensate for the difference in the length of the stalks, and consequently is possessed of the capacity of cutting the heads from the stalks at a common point below the heads.

Another object is the provision in a corn harvester of the kind stated of improved and highly efficient cutting mechanism.

Another object is the provision of an appurtenance calculated to coöperate with and contribute to the efficiency of the cutting mechanism.

With the foregoing in mind the invention will be fully understood from the following description and claims when the same are read in connection with the drawings, accompanying and forming part of this specification, in which:

Figure 1 is a top plan view of one type of harvester embodying my invention.

Fig. 2 is a rear elevation of same.

Fig. 3 is a vertical section on line 3—3 of Fig. 1.

Fig. 4 is an enlarged detail plan of the cutting mechanism.

Fig. 5 is a vertical section of the same.

Fig. 6 is a fragmentary perspective of the stalk engaging transverse bar of the improvement.

Similar numerals designate corresponding parts in all views.

Among other features my novel harvester comprises an organized mechanism that includes a stalk bender 1, a cutting apparatus 2, a reel 3 which, in common with the cutting apparatus 2 and the bender 1, is arranged transversely of the machine and is provided with curved blades $3^x$, and a transversely traveling conveyer 4, of common draper type or other suitable type, disposed in rear of the reel and adapted to carry the heads transversely of the harvester. Said conveyer 4 is adapted to discharge the corn to an elevator $4^x$. The bender 1, as its name imports, is designed to bend the stalks downwardly so that the same will be engaged by the cutting apparatus 2 at about the same distance from the heads thereof. At such time the stalks will be more or less inclined according to the height, and the reel will operate to further bend the stalks over the cutting apparatus, and will not only prevent the severed heads from falling in front of the cutting apparatus, but will tend to throw the heads rearwardly into engagement with the conveyer 4.

In conjunction with the cutting apparatus 2 I provide a transverse bar $2^x$, carried by bracket arms $2^y$ which by preference are adjustably connected to a fixed transverse angle bar $2^z$. Said bar $2^x$ is parallel with and slightly below the sickle bar 16, hereinafter described, and it therefore serves, Fig. 3, to hold the stalks away from the knives of the sickle bar until the heads are engaged by the reel 3. In this way the likelihood of the stalks being cut too long and falling in front of the knives is averted. Manifestly when made adjustable the bar $2^x$ may be accurately positioned to suit the height of the corn.

I have elected to show and describe the said organized mechanism as incorporated in a horse-drawn apparatus. I would have it understood, however, that without affecting my invention, the said organized mechanism may be embodied in an attachment to be used at the front end of a grain header or harvester.

The main frame 6 of my apparatus may obviously be of the construction illustrated, or of any other construction compatible with the purpose, of the invention, and to the same a tongue 7 is shown as connected. The said main frame is supported by ground wheels 8 and 9, and fixed with respect to the inner ground wheel 9 is a sprocket gear 10. The driver's seat 11 is carried by a support 12 on frame 6, and is preferably disposed above the upper transverse frame portion as illustrated. By reference to Fig. 3, it will be observed that the bender 1 has a lower portion 14 slightly declined from the horizontal rearwardly, and a forward portion 15 that extends upwardly from the portion 14 and then rearwardly and is rounded or convex at its forward side. From this it follows that the said forward convex portion 15 will prevent the heads that are bent over from catching against the forward edge of the portion or table 14. The bender 1 is shown as fixed with respect to the main frame, but manifestly it may be made adjustable so that it may be positioned at various heights.

The cutting apparatus 2 comprises a reciprocatory sickle or knife bar 16, guards $16^x$ and long guard teeth 17; the guards $16^x$ and teeth 17 being bolted and fixed to the bar $2^z$. The teeth 17 are relatively arranged and shaped as shown in Fig. 1; the gradual narrowing of the spaces between the same lessening the liability of clogging. The bender extends over and in spaced relation to the teeth 17, and hence it is impossible for a short head to precede a tall head in the same intervening space $17^x$ after the heads reach positions under the bender, as they are then of the same height. The points of the guard teeth 17 extend to a line below an intermediate point of the bender portion 14, Fig. 3, and are adapted to engage the stalks while the latter are inclined. It will be noticed, however, that the said teeth points are spaced a considerable distance apart, and hence while the stalks are being bent downwardly there is plenty of room for a comparatively short stalk to pass a longer one *en route* to the sickle bar and before the stalks reach the narrow part of the space between the guard teeth. There is a set of guards $16^x$ and guard teeth 17 in spaced relation to each knife on bar 16.

By reference to the drawings, it will be observed that the reel 3 is equipped at its left-hand end with a sprocket gear 19, and that said sprocket gear 19 is connected through a sprocket belt 20 with the beforementioned gear 10, whereby forward rotation of the reel will be caused to attend forward movement of the harvester.

Interposed between the sickle bar 16 of the cutting mechanism and a shaft $16^a$ connected with the drive-shaft 21 of the apparatus, Fig. 1, is the pitman rod 22 which is connected with the sickle bar 16 and the shaft $16^a$ in the ordinary well known manner or in any other approved manner compatible with the operation of my improvement.

A conveyer table 23 is arranged transversely in rear of the cutting apparatus, and is provided with a transverse guard wall 24 at its rear edge, and over the said table is arranged to move the upper stretch of the conveyer 4. The driving connections are preferably, though not necessarily, arranged as shown in Figs. 1, 2 and 3. In consequence of this, forward rotation of the reel will be attended by movement of the conveyer 4 and elevator $4^x$ toward the left-hand side of the harvester.

At 29 is a fender which rests adjacent to the inner ground wheel and is designed to prevent the said wheel from running over and depressing leaning stalks. On the other hand the said fender is adapted to deflect leaning stalks so as to guide the same in front of the cutting apparatus, its forward portion being deflected laterally inward, as indicated by $29^a$, Fig. 1.

The operation of my improvement will be apparent from the foregoing, and need not be reiterated except to say that incidental to the forward progress of the harvester, the stalks will be bent by the bender 1, and will be engaged by the guard teeth 17 on the bar $2^z$ and the blades 18 on the sickle bar 16, while the heads will be engaged by the reel 3, and when severed from the stalks, will be delivered by said reel to the conveyer 4 by which the heads will be discharged to the elevator for transfer to the body of the wagon. A chain 61, Fig. 2, is preferably, though not necessarily, employed to maintain the elevator in the inclined position illustrated, and to permit of the elevator being adjusted when occasion demands.

Having described my invention, what I claim and desire to secure by Letters-Patent, is:—

1. In means for harvesting Egyptian corn, milo maize and the like, the combination of a main shaft, ground wheels thereon, a main frame supported on said shaft, a fixed transversely arranged stalk bender arranged over and extending forwardly beyond the inner ground wheel and having a forward portion convex at its forward side and also having a table extending rearwardly from the bottom of said forward portion, a fender connected with said bender and disposed alongside the inner ground wheel, a cutting apparatus disposed in rear of the bender, a reel disposed above the cutting apparatus and in rear of the bender, a conveyer disposed in rear of the cutting apparatus, a driving connection between the main shaft and the sickle bar of the cutting apparatus, a driving connection intermediate of the inner ground wheel and the reel, a driving connection intermediate of the reel and the conveyer, a transversely arranged elevator adapted to receive heads from the conveyer and having an endless draper, and a driving connection between the conveyer and said draper.

2. In means for harvesting corn, maize and like, the combination of a fixed transversely arranged stalk bender having a forward portion convex at its forward side and also having a table extending rearwardly from the bottom of said forward portion, a reel in rear of said table and extending below the plane of the same, and a cutting apparatus including a sickle bar disposed under the reel and guard teeth extending forwardly from the sickle bar and under the bender table and having tapered forward portions whereby the spaces between said teeth are gradually narrowed to intermediate points in the length of the teeth and from said points to the sickle bar are comparatively narrow.

3. In means for harvesting corn, maize and the like, the combination of a fixed transversely arranged stalk bender having a forward portion convex at its forward side and also having a table extending rearwardly from the bottom of said forward portion; said table inclined rearwardly, a reel in rear of the table and extending below the plane of the same, and a cutting mechanism under the reel and having reciprocatory cutting means and also having spaced guard teeth extending forwardly from the cutting means and under the bender.

4. In means for harvesting corn, maize and the like, the combination of a bender having a table, a reel in rear of the same, cutting mechanism under and spaced from the reel and the table, and a transverse bar under the cutting mechanism to hold stalks away from the cutting mechanism until the heads are engaged by the reel.

In testimony whereof I affix my signature.

RAYMOND A. BOTTS.